United States Patent

Grosso et al.

Patent Number: 5,901,910
Date of Patent: May 11, 1999

[54] METAL RECOVERY FROM SALT CAKE AND OTHER COMPOSITIONS

[75] Inventors: Philip Grosso, Auburn; Ralph Cheek, Los Altos Hills, both of Calif.; Robert L. Hargis, Knoxville, Tenn.

[73] Assignee: IMCO Recycling, Inc., Irving, Tex.

[21] Appl. No.: 08/797,528

[22] Filed: Feb. 7, 1997

[51] Int. Cl.⁶ .................................................. B02C 23/08
[52] U.S. Cl. ................... 241/24.14; 241/24.15; 241/29; 241/76; 241/79.1; 241/152.2
[58] Field of Search ............... 241/24.13, 24.14, 241/24.15, 27, 29, 79.1, 76, 77, 78, 152.2

[56] References Cited

U.S. PATENT DOCUMENTS

| | | |
|---|---|---|
| 3,086,718 | 4/1963 | Lukas, Jr. .................................. 241/24 |
| 4,073,644 | 2/1978 | Papafingos et al. . |
| 4,330,090 | 5/1982 | Montagna et al. . |
| 5,133,505 | 7/1992 | Bourcier et al. . |
| 5,174,509 | 12/1992 | Starke et al. . |
| 5,356,082 | 10/1994 | Prinz et al. . |

*Primary Examiner*—John M. Husar
*Attorney, Agent, or Firm*—Haynes and Boone, L.L.P.

[57] ABSTRACT

A method for recovering aluminum metal from varied size clumps of salt cake. The salt cake clumps have varied concentrations of aluminum metal. The method includes steps of segregating the varied size clumps into smaller clumps and larger clumps, by size; separating, by aluminum metal concentration, the larger clumps into clumps of higher aluminum metal concentration and reject clumps of lower aluminum metal concentration; impacting the reject clumps to size-reduce the clumps to smaller reject clumps; returning the smaller reject clumps after impacting to the previous step of segregating; segregating the smaller clumps from the step of segregating into large clumps and small clumps, by size; separating, by aluminum metal concentration, the small clumps into clumps of higher aluminum metal concentration and second reject clumps of lower aluminum metal concentration; and separating the second reject clumps into clumps of higher aluminum metal concentration and third reject clumps of lower aluminum metal concentration. The steps of separating are each performed by magnetic repelling forces of eddy current separators. In the third separating step, the eddy current separator operates in conjunction with a splitter that collects high aluminum concentration pieces based on the trajectory of the pieces coming off the belt at the discharge rotor. The system and method may also be employed to recover aluminum metal from dross or other matter and to recover other types of metals.

15 Claims, 2 Drawing Sheets

METAL RECOVERY FROM SALT CAKE AND OTHER COMPOSITIONS

BACKGROUND OF THE INVENTION

The present invention relates to systems and methods for recovering metal from salt cake and similar compositions and, more particularly, relates to such systems and methods employing staged eddy current separators to recover product having significantly high metal concentrations from salt cake or similar matter.

Salt cake is obtained in the remelting of metal scrap, such as aluminum scrap or dross. In the remelting of aluminum or aluminum bearing materials, a flux is employed that includes a mixture Of salt, primarily potassium chloride and sodium chloride, and a fluoride compound typically cryolite. The flux is employed to remove impurities from the remelted scrap, to reduce oxidation of the metal and to enhance separation of the metal from non-metal constituents. When the remelting furnace is tapped after the remelting process, pure (i.e., refined) metal is obtained as a product. A byproduct of the process that is also obtained is salt cake.

The salt cake includes the flux, impurities that were contained in the metal, metal oxides, and remaining metal remnants not separated as pure metal product through the remelting process. The metal remnants remain in the salt cake because they do not coalesce into larger metal pieces during the remelting process. The larger metal pieces are retrieved as product, but the remnants are not separated from the salt cake. In cases in which aluminum is the recovered metal, the salt cake, including aluminum remnants trapped in the salt cake, is typically disposed as waste, for example, by dumping in a landfill.

Several techniques for separating aluminum from salt cake are conventional. One of these techniques employs crushing and screening to separate aluminum from non-aluminum particles of salt cake. Several stages of crushing and screening have at times been employed. In the case of several stages, the screening at each successive stage removes smaller particles than those removed in the prior stage. A significant disadvantage of the technique is that much of the aluminum in the salt cake is not retrieved and is, instead, dumped in landfills with the salt cake.

In another technique, the raw material is crushed and then ground to smaller particles. The grinding serves to flatten aluminum particles of the raw material, making them larger in two dimensions than the non-aluminum particles of the raw material. The particles are then screened in several stages of different size screens to remove the particles of the raw material according to size. The larger particles removed have a higher concentration of aluminum. A significant disadvantage of the technique, however, is that the process is expensive. In addition, the resultant non-metallic material is so fine as to be dusty and otherwise difficult to handle in a landfill.

Another conventional technique for removing aluminum from salt cake dissolves the salt of the cake, thereby freeing the aluminum and other non-dissolvable particles. In this technique, the salt cake is first crushed and ground. Water is then added to dissolve the salt. The solution is wet screened to recover the aluminum and other non-dissolvable particles. Disadvantages of the technique, however, include wetting of the salt cake that causes oxidation of some of the remaining aluminum, a wet, non-metallic byproduct which must be removed by filtering, and salt solution which must be discarded or from which salts must be recovered, for example, by an additional process such as evaporative crystallization. In addition, the process involves significant energy consumption and operating and capital costs are high.

Therefore what is needed is a method for aluminum recovery from salt cake and a system for performing that method that overcome the disadvantages and problems of the foregoing techniques and systems.

SUMMARY OF THE INVENTION

The embodiments of the present invention, accordingly, provide methods and systems for recovery of aluminum metal from salt cake. The processes and systems provide advantages of increased aluminum metal recoveries, desirable economics, efficient operations, or by-products, and others.

To this end, an embodiment of the invention is a method for recovering aluminum metal from varied size clumps of salt cake. The varied size clumps contain varied concentrations of aluminum metal. The method includes steps of first segregating the varied size clumps into smaller clumps and larger clumps, by size, first separating the larger clumps into first high aluminum metal concentration clumps and first reject clumps, by aluminum metal concentration, impacting the first reject clumps, returning the first reject clumps from the step of impacting to the step of first segregating, second segregating the smaller clumps into small clumps and smallest clumps, by size, second separating the small clumps into second high aluminum metal concentration clumps and second reject clumps, by aluminum metal concentration, and third separating the second reject clumps into third high aluminum metal concentration clumps and third reject clumps, by aluminum metal concentration.

Another embodiment of the invention is a method for recovering aluminum metal from varied size clumps of salt cake. The varied size clumps contain varied concentrations of aluminum metal. The method includes a step of separating the clumps into high aluminum metal concentration clumps and low aluminum metal concentration clumps.

Yet another embodiment of the invention is a system for recovering aluminum metal from varied size clumps of salt cake. The varied size clumps contain varied concentrations of aluminum metal. The system includes means for first segregating the varied size clumps into smaller clumps and larger clumps, by size, means for first separating the larger clumps into first high aluminum metal concentration clumps and first reject clumps, by aluminum metal concentration, means for impacting the first reject clumps, means for returning the first reject clumps from the means for impacting to the means for first segregating, means for second segregating the smaller clumps into small clumps and smallest clumps, by size, means for second separating the small clumps into second high aluminum metal concentration clumps and second reject clumps, by aluminum metal concentration, and means for third separating the second reject clumps into third high aluminum metal concentration clumps and third reject clumps, by aluminum metal concentration.

Another embodiment of the invention is a system for recovering aluminum metal from varied size clumps of salt cake. The varied size clumps contain varied concentrations of aluminum metal. The system includes means for separating the clumps into high aluminum metal concentration clumps and low aluminum metal concentration clumps.

Yet another embodiment of the invention is a system for magnetic separation. The system includes a drum having a circumference, a circular belt connected to the circumference of the drum, the circular belt rides along the circumference of the drum and the drum is located within the circular belt, a discharge rotor also connected to the circular belt, the circular belt rides along the circumference of the discharge rotor and the discharge rotor is located within the circular belt, a splitter guide operatively connected to the discharge rotor, and a splitter connected to the splitter guide for sliding engagement and select securement with the splitter guide.

Another embodiment of the invention is a method for recovering a product having a significant concentration of a metal from varied size clumped compositions of the metal and other matter. The varied size clumped compositions contain varied amounts the metal. The method includes steps of impacting the varied size clumped compositions to obtain size-reduced clumps and eddy current separating the size-reduced clumps into size-reduced clumps of the significant concentration and size-reduced clumps of less than the significant concentration.

Yet another embodiment of the invention is a system for recovering a product having a significant concentration of a metal from varied size clumped compositions of the metal and other matter. The varied size clumped compositions contain varied amounts of the metal. The system includes means for impacting the varied size clumped compositions to obtain size-reduced clumps and means, operatively connected to the means for impacting, for eddy current separating the size-reduced clumps into size-reduced clumps of the significant concentration and size-reduced clumps of less than the significant concentration.

A further embodiment of the invention is a system for recovering a product having a significant concentration of a metal from varied size clumped compositions of the metal and other matter. The varied size clumped compositions contain varied amounts of the metal. The system includes an impactor for crushing the varied size clumped compositions to obtain size-reduced clumps and an eddy current separator, operatively connected to the impactor, for separating the size-reduced clumps into size-reduced clumps of the significant concentration and size-reduced clumps of less than the significant concentration.

DETAILED DESCRIPTION OF THE PREFERRED EMBODIMENT

Figure 1:
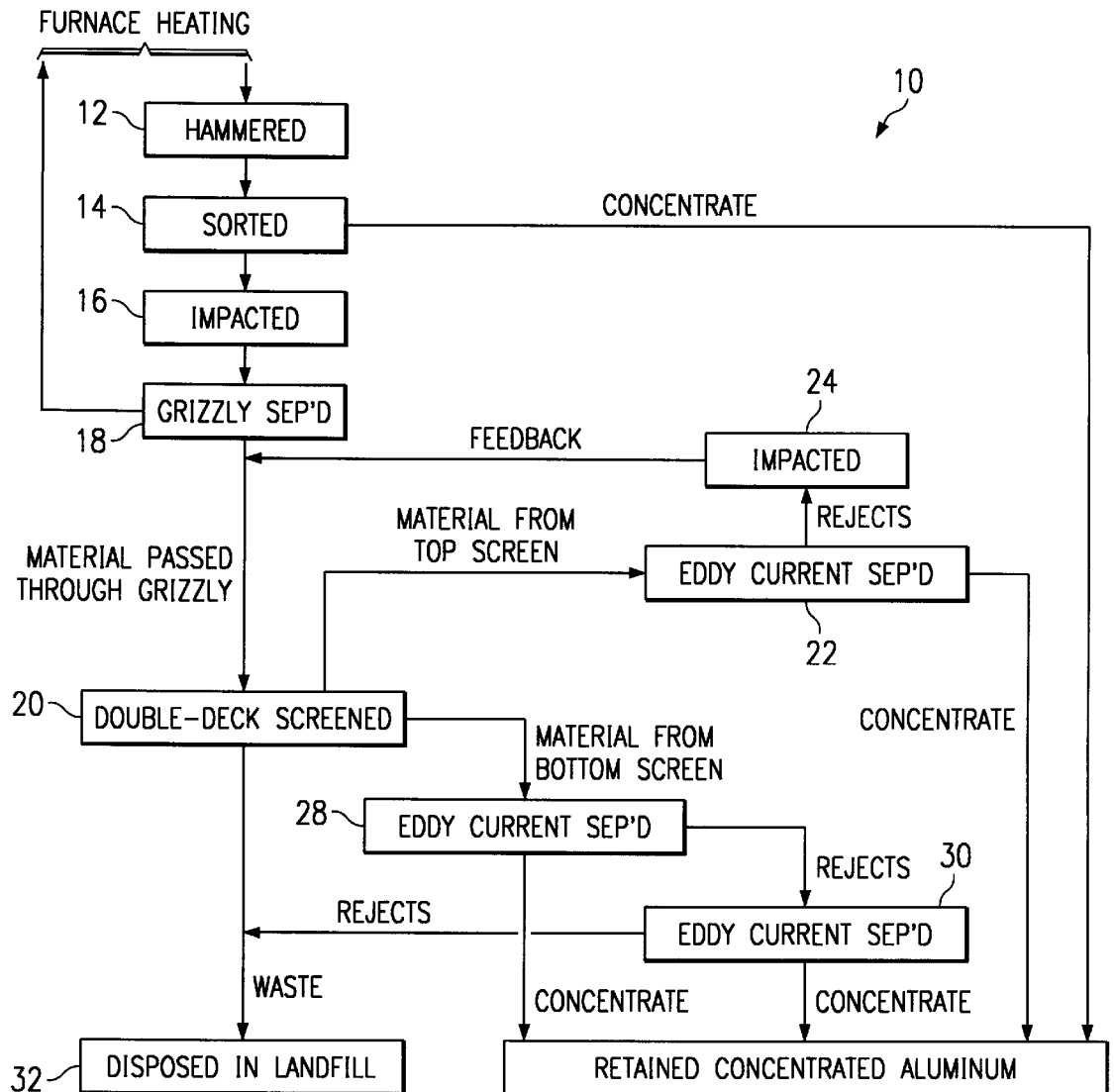
FIG. 1 is a flow diagram of a process for recovering aluminum metal from salt cake, according to embodiments of the present invention.

Method for Recovering Aluminum Metal from Salt Cake:

Referring to FIG. 1, a method 10 for recovering aluminum metal from salt cake is initiated by a step 12. In the step 12, salt cake containing aluminum metal, such as the salt cake recovered from dross in a conventional furnace heating operation, is hammered to break the clumps of salt cake containing the aluminum metal into smaller pieces. A conventional jack hammer or some other hammering device may, for example, be employed for the step 12. After the step 12, the pieces obtained from breaking the clumps are sorted in a step 14 to separate the largest aluminum metal pieces from all other pieces. The step 14 may, for example, be performed as a hand sort by a human to remove those pieces that are judged to be too large or otherwise problematic for further crushing. Those largest aluminum metal pieces so separated in the step 14 are retained as product aluminum metal and sent to a furnace for metal recovery.

In a step 16, all of the pieces which are not retained in step 14 are impacted to crush the pieces into smaller crushed pieces. The step 16 is, for example, performed by impact crushing the pieces by an impactor, such as a conventional impact crusher. The crushed pieces from the step 16 are magnetically separated into relatively highly magnetically attracted pieces, such as those pieces having high iron content, and other crushed pieces, in a step 17. The step 17 is performed by a magnet device, for example, a magnetic head pulley. The relatively highly magnetically attracted pieces stick to the magnet device and are thereby removed from the other crushed pieces, whereas the other crushed pieces do not so stick.

The crushed pieces that do not stick to the magnet device are grizzly separated in a step 18. The step 18 is performed by shaking the crushed pieces from step 16 over a slightly declining grate, such as a grate formed of a series of evenly spaced bars which are longitudinal along the decline. The larger crushed pieces remain atop the grate and pass along the decline until they fall off the top of the grate, and the other crushed pieces pass between the bars of the grate. The larger crushed pieces which pass along the decline and off the top of the grate are hand sorted in high-aluminum metal concentration and low-aluminum metal concentration fractions. The determination of high- versus low-aluminum metal concentration is performed by a human viewing the pieces to detect approximate metal content. The high-aluminum metal concentration pieces are picked from the other pieces and returned to the conventional furnace for metal recovery. The furnace operation may yield additional salt cake containing aluminum metal that may be processed by the method 10. The low-aluminum metal concentration fraction is returned to the impactor.

In a step 20, the crushed pieces that pass between the bars of the grate are double-deck screened. The step 20 of double-deck screening includes a first screening to separate the crushed pieces into larger pieces and smaller pieces. A first screen, which, for example, is a conventional screen positioned at a decline, is employed in the first screening of step 20. The larger pieces remain atop the first screen, and the smaller pieces pass through the first screen. The step 20 of double-deck screening also includes a second screening to segregate the larger and smaller of the pieces that pass through the first screen. A second screen, which, for example, is also a conventional screen positioned at a decline, is employed in the second screening of step 20. The second screen has a smaller aperture size than the first screen. In the second screening, the larger pieces among the pieces that passed through the first screen in the first screening remain atop the second screen, and the smaller of those pieces pass through the second screen.

In a step 22, the larger pieces that do not pass through the first screen in the step 20 are eddy current separated into pieces having significant aluminum metal concentration and pieces having lower aluminum metal concentration. The term "significant" as used herein with respect to aluminum metal concentration is intended to indicate a particular limit value of aluminum metal concentration which is the lowest aluminum metal concentration which is sought as the product aluminum metal obtained from the method 10. Of course, the significant aluminum metal concentration desired for the product of the method 10 in any instance may change according to the desired results of the method 10. In every event, the significant aluminum metal concentration value must be within the range of concentration values that are, in fact, physically obtainable from the method 10. At times herein, the terms "aluminum concentration" may be used; those terms are intended to refer to aluminum metal concentration only and not to other forms of aluminum.

In the eddy current separation of step 22, magnetic forces are created by a conventional eddy current separator. At the eddy current separator, the magnetic forces so created repel the pieces having significant aluminum metal concentration from among the pieces having lower aluminum metal concentration. The pieces having lower aluminum metal concentration are repelled to a lesser degree than those having significant metal concentration. When a splitter, such as a metal sheet, is selectively placed within the trajectory path of the pieces repelled by the eddy current separator, the pieces that are more greatly repelled pass over the splitter, whereas the other pieces do not pass over the splitter. The repelling force, by virtue of and in cooperation with the select placement of the splitter, therefore, separates the pieces having significant aluminum metal concentration from the pieces having lower aluminum metal concentration. The repelled pieces having significant aluminum metal concentration from the step 22 are retained from the method 10 in the step 15. These pieces having significant aluminum metal concentration are also the product aluminum metal obtained from the method 10.

The pieces that have lower aluminum metal concentration, obtained from the eddy current separation of the step 22, are further impacted in a step 24. The step 24 crushes the pieces having lower aluminum metal concentration to size-reduce them. The crushed pieces of the step 24 are returned to the step 20 and again double-deck screened in the step 20. The method 10 thereafter continues with respect to those crushed pieces from the step 20 as just described. The return of the crushed pieces of the step 24 to the double-deck screening of step 20 effects feedback for achieving a desired concentration of aluminum metal in the product aluminum metal obtained from the method 10 and also recovers additional aluminum metal from the pieces first rejected in the step 22.

In a step 28, the pieces which pass through the first screen in the first screening but not through the second screen in the second screening of the step 20 are eddy current separated. As with the eddy current separation of the step 22, the pieces having significant aluminum metal concentration are repelled and the pieces having lower aluminum metal concentration are not so greatly repelled. This separates the pieces having significant aluminum metal concentration from the pieces having lower aluminum metal concentration. From the step 28, the pieces having significant aluminum metal concentration are retained from the method 10 in the step 15. These pieces having significant aluminum metal concentration are also the product aluminum metal obtained from the method 10.

The pieces having lower aluminum metal concentration in the step 28 are further eddy current separated in a step 30. In the step 30, those pieces from the step 28 are further separated into pieces having significant aluminum metal concentration and pieces not having significant aluminum metal concentration. Aluminum metal concentrations that are significant in the step 30 are less than aluminum metal concentrations that are significant in the step 28. The step 30, therefore, makes a "deeper cut" of the pieces than the step 28, yielding a greater quantity of the pieces having significant aluminum metal concentration that are separated in the step 30. These pieces having significant aluminum metal concentration are, however, a lower grade in that they are of lesser aluminum metal concentration than the pieces retained from the eddy current separation of step 28. The pieces having significant aluminum metal concentration as separated in the step 30 are retained from the method 10 in the step 15. These pieces having significant aluminum metal concentration are also the product aluminum metal obtained from the method 10.

Figure 2:
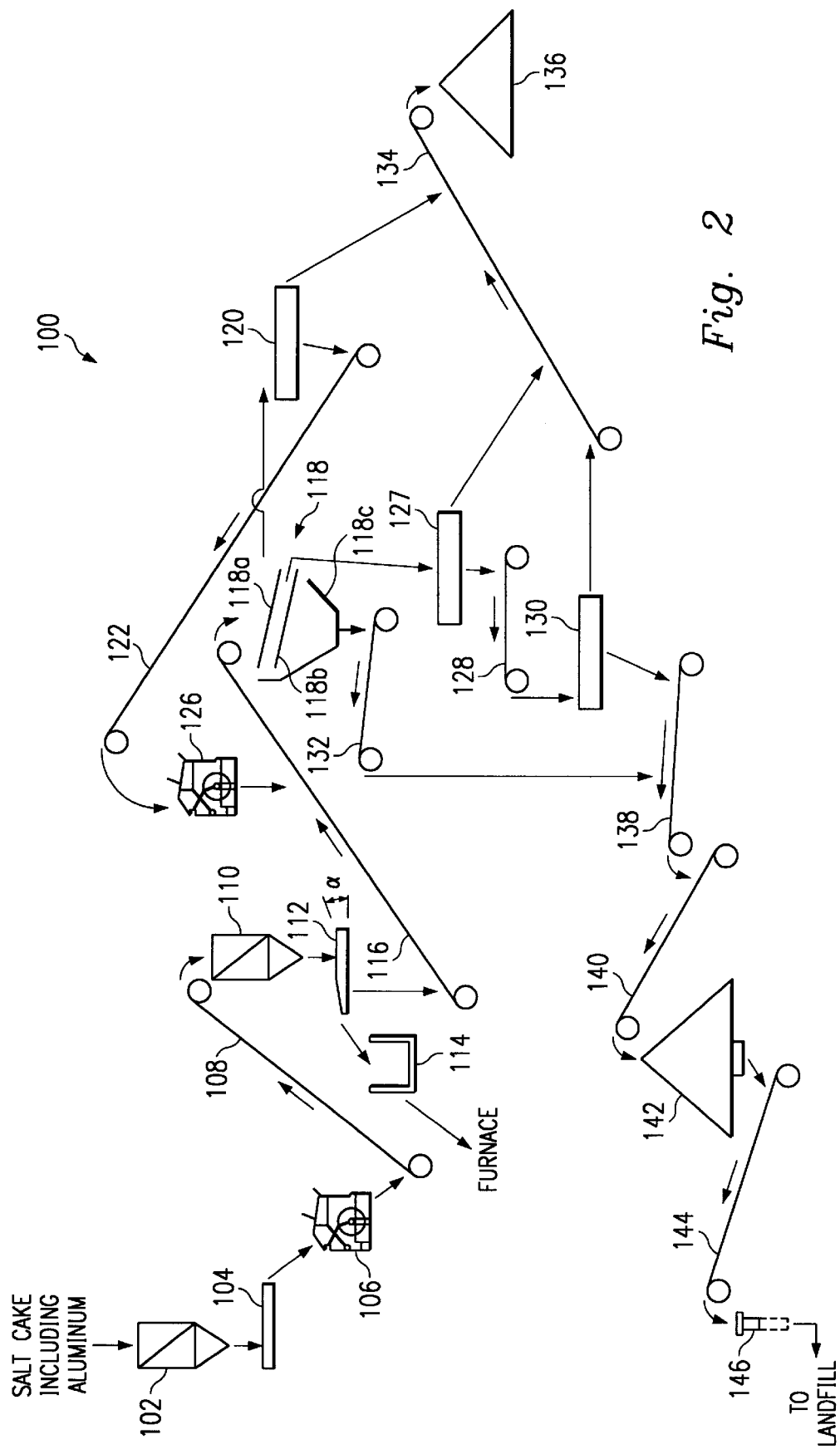
FIG. 2 is a simplified representation of a plant for aluminum metal recovery from salt cake that performs the process shown in FIG. 1, according to embodiments of the present invention.

System for Recovering Aluminum Metal from Salt Cake:

Referring to FIG. 2, a system 100, such as a processing plant, for recovering aluminum metal from salt cake according to the method 10 of FIG. 1 includes a first surge hopper 102. The first surge hopper 102 is a conventional hopper of the type including a storage bin portion and an output feeder portion. The output feeder portion includes a regulator, such as a hole of variable size, for selectively outputting the contents of the first surge hopper 102. The storage bin portion serves to contain salt cake containing aluminum metal, which salt cake has been recovered, for example, from heating of dross in the conventional furnace heating operation and loaded into the storage bin portion. The output feeder portion serves to selectively output the salt cake loaded into the storage bin portion so as to control the rate of feed of the salt cake contained in the first surge hopper 102 for processing by the system 100. The first surge hopper 102 is, for example, a sixty eight (68) ton surge hopper.

The salt cake is output by the first surge hopper 102 onto a feeder 104. The feeder 104 is operatively connected to the first surge hopper 102 to receive the salt cake so output. The feeder 104 includes a conveyor and a measurement instrument. The conveyor 104 transports the salt cake, and the measurement instrument measures weight of the salt cake so transported. The feeder 104 is, for example, a metering conveyor (i.e., a conveyor equipped to measure the conveyed materials) or other conventional transport and measurement device or devices. In one example, the feeder 104 measures 50"×20" and is capable of conveying and measuring up to at least about 50+/− tons per hour.

A first impact crusher 106 is operatively connected to the feeder 104 to receive the salt cake from the feeder 104. The first impact crusher 106 is capable of crushing blocks which are from about 2 feet to about 3 feet square to size-reduced particles which are about 3 inches square or less. The first impact crusher 106 is a conventional impact crusher, for example, a 300 HP impact crusher machine. A first conveyor 108 transports the reduced particles from the first impact crusher 106.

A second surge hopper 110 is operatively connected to the first conveyor 108 to receive the reduced particles from the first conveyor 108. The second surge hopper 110 contains the reduced particles. The second surge hopper 110 is substantially similar to the first surge hopper 102, both in design and function. The second surge hopper 110 is, for example, a twenty five (25) ton surge hopper. The second surge hopper 110 selectively outputs the reduced particles contained therein.

The reduced particles are so output by the second surge hopper 110 to a grizzly feeder 112 operatively connected to the second surge hopper 110 to receive the reduced particles. The grizzly feeder 112 is a generally planar grate having parallel bars evenly spaced across the grate. The grizzly feeder 112 is positioned in a declining manner, so that the parallel bars extend longitudinally in the direction of the decline. A decline angle α of the grizzly feeder 112 is sufficient to cause the size-reduced particles to progress along the decline at a suitable rate. The parallel bars of the grizzly feeder 112 are spaced, for example, about 3 inches apart to prevent the reduced particles which are greater than about 3 inches square from passing through the grate. The grizzly feeder 112, for example, measures 42"×17" and passes up to at least about 28.21 tons per hour. Particles which do not pass through the grizzly feeder 112 are contained within a bin 114 operatively connected to the grizzly feeder 112, such as a conventional concrete bin or other bin. Contents of the bin 114 are periodically unloaded to the conventional furnace heating operation. A second conveyor 116 operatively connected to the grizzly feeder 112 receives and conveys the particles which pass through the grizzly feeder 112.

A double-deck screen 118 is operatively connected to the second conveyor 116 to receive the particles from the conveyor 116. The double-deck screen 118 includes a first screen 118a and a second screen 118b. The first screen 118a and the second screen 118b are positioned parallel each to the other and in a declining manner. A decline angle β of the first and second screens 118a and 118b of the double-deck screen 118 is sufficient to cause the reduced particles to progress along the decline at a suitable rate. The first screen 118a has a mesh size, for example, of ½ inch square to prevent particles which are greater than about ½ inch square from passing through the first screen 118a. The second screen 118b has a smaller mesh size than the first screen 118a, for example, the second screen 118b is a #10 mesh screen. The first and second screens 118a and 118b each measure about 4'×12" in one example. The first and second screens 118a and 118b are operatively connected so that the particles which pass through the first screen 118a are directly deposited by the first screen 118a atop the second screen 118b. The double-deck screen 118 also includes a collector 118c, such as a generally funnel-shaped bin with an output hole, operatively connected to the second screen 118b to collect and funnel the particles which pass through the second screen 118b.

A first eddy current separator 120 is operatively connected to the first screen 118a to receive the particles which do not pass through the first screen 118a. The first eddy current separator 120 is capable of eddy current separations of the particles in quantities up to at least about 9.32 tons per hour. The first eddy current separator 120 is, for example, available from Huron Valley Steel of Belleville, Mich., Model Mark IV-48. A third conveyor 122 is operatively connected to the first eddy current separator 120 to receive the particles having less than significant aluminum metal concentration from operation of the first eddy current separator 120.

A second impact crusher 126 is operatively connected to the third conveyor 122 to receive the particles from the third conveyor 122. The second impact crusher 126 is, for example, a Stedman Model GS3030 impact crusher, available from Stedman Machine Co., of Aurora, Ind.. The second impact crusher 126 is capable of reducing the particle sizes, such as to less than about ½ inch square. The second impact crusher 126 is also operatively connected to the second conveyor 116 such that the second conveyor 116 receives the crushed particles from the second impact crusher 126 and conveys them to the double-deck screen 118.

A second eddy current separator 127 is operatively connected to the double-deck screen 118 to receive the particles which pass through the first screen 118a but not through the second screen 118b. The second eddy current separator 127 is substantially identical to the first eddy current separator 120, for example, the second eddy current separator 127 is available from Huron Valley Steel of Belleville, Mich., Model Mark IV-48. A fourth conveyor 128 is operatively connected to the second eddy current separator 127 to receive the particles having less than significant aluminum metal concentration from operation of the second eddy current separator 127.

A third eddy current separator 130 is operatively connected to the fourth conveyor 128 to receive the particles thereby conveyed. The third eddy current separator 130 is substantially identical to the first and second eddy current separators 120 and 127, for example, the third eddy current separator 130 is available from Huron Valley Steel of Belleville, Mich., Model Mark IV-48.

A fifth conveyor 132 is operatively connected to the collector 118c of the double-deck screen 118 to receive the collected particles output by the collector 118c. A sixth conveyor 134 is operatively connected to each of the first, second, and third eddy current separators 120, 127 and 130, to receive the particles having significant aluminum metal concentration obtained from the respective eddy current separation operations. The sixth conveyor 134 serves to transport the particles having significant aluminum metal concentration to storage 136.

A seventh conveyor 138 is operatively connected to the fifth conveyor 132 to receive particles conveyed by the fifth conveyor 132 and to the third eddy current separator 130 to receive the particles having less than significant aluminum metal concentration from operation of the third eddy current separator 130. The seventh conveyor 138 is also operatively connected to an eighth conveyor 140 for receiving the particles from the seventh conveyor 138. A storage building 142 is operatively connected to the eighth conveyor 140 to receive the particles from the eighth conveyor 140. A ninth conveyor 144 is operatively connected to the storage building 142 to receive the particles from the storage building 142. The ninth conveyor 144 is connected to loadout equipment 146 which serves to receive the particles from the ninth conveyor 144. The loadout equipment 146 allows for loading of vehicles which transport the particles for disposal in landfills. The conveyors 108, 116, 122, 128, 132, 134, 138, 140, and 144, the storage building 142, and the loading equipment 146 are all of conventional types known to those skilled in the art.

Figure 3:
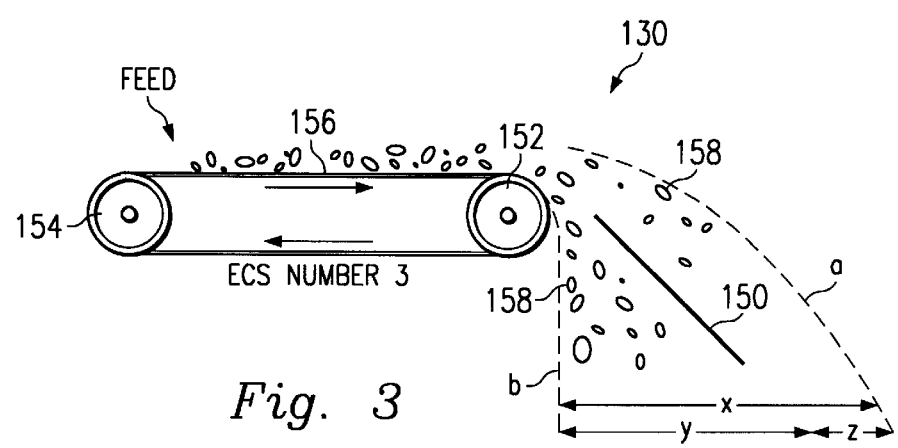
FIG. 3 is a simplified, elevational side view of a discharge rotor of a eddy current separator having a splitter that is variably positionable with respect to the discharge rotor within a trajectory zone of the separator, according to embodiments of the present invention.

Referring to FIG. 3, the third eddy current separator 130 is equipped with a splitter 150. The eddy current separator 130 also includes a drum 154 and a belt 156, as is conventional. The splitter 150 is variably positionable with respect to a discharge rotor 152 of the third eddy current separator 130. The splitter 150 is attached to a guide (not shown) for movement of the splitter along the guide to vary the position of the splitter 150 with respect to the discharge rotor 152. The splitter 150 is securable to the guide when located as desired, for example, by bolts. The positioning of the splitter 150 with respect to the discharge rotor 152 serves to desirably segregate particles 158 coming off the belt 156 at the discharge rotor 152. The particles coming off the splitter 150 are discharged over a trajectory zone x because particles 158 of any particular aluminum metal composition are either more or less repelled by magnetic effects of the discharge rotor 152 than particles 158 of different aluminum metal composition. As previously described, the particles 158 having higher concentrations of aluminum metal are more greatly repelled than the particles 158 having lower concentrations of aluminum metal. The repelling causes dispersement of the particles 158 throughout the trajectory zone x, according to the aluminum metal concentration of the particles 158 with respect to others of the particles 158. The dispersement is in the nature of a gradient of concentrations of the particles 158, such that the particles 158 having highest aluminum metal concentration are dispersed to a first region a of the trajectory zone x farthest from the discharge rotor 152, the particles 158 having the lowest aluminum metal concentration are dispersed to a second region b of the trajectory zone x closest to the discharge rotor 152, and the dispersement of the particles 158 between the first region a and the second region b occurs according to higher to lower aluminum metal concentrations. As will be understood by those skilled in the art, varying the position of the splitter 150 forms a trajectory zone z for the particles 158 having significant aluminum metal concentration and a trajectory zone y for the particles 158 having less than significant aluminum metal concentration. In this manner, a desired "cut" of the particles 158 to segregate the particles 158 having significant aluminum metal concentration from the others of the particles 158 is achieved.

Referring to FIGS. 1, 2, and 3, in conjunction, in operation of the system 100, salt cake, including aluminum metal that has been recovered from heating of dross in the conventional furnace heating operation, is jack-hammered, hand sorted, and loaded into the first surge hopper 102. The first surge hopper 102 is controlled to deposit suitable amounts of salt cake onto the feeder 104, for example, about 50 tons per hour of salt cake. The feeder 104 passes the salt cake, after the salt cake has cooled, to the first impact crusher 106.

The first impact crusher 106 has a gap setting of 1st 6–8 inches, 2nd ~4 inches. Thus, the first impact crusher 106 crushes the salt cake to yield pieces about 3 inches square. The first impact crusher 106 passes the salt cake pieces to the first conveyor 108. The first conveyor 108 conveys the salt cake pieces to pass under a magnet 109, for example, a magnetic head pulley. The salt cake pieces having highest concentrations of magnetically attractive metals are attracted to and retained by the magnet 109. The salt cake pieces that are not retained by the magnet 109, after passing under the magnet 109, are delivered by the first conveyor 108 to the second surge hopper 110. The salt cake pieces so delivered are loaded into the second surge hopper 110. The second surge hopper 110 is controlled to deposit suitable amounts of salt cake pieces onto the grizzly feeder 112, for example, about 28.31 tons per hour.

Salt cake pieces that are no greater than about 3 inches square pass through the grizzly feeder 112, for example, at a rate of about 28.21 tons per hour. Larger salt cake pieces remain atop the grizzly feeder 112. The larger pieces atop the grizzly feeder 112 slide down the grizzly feeder 112 into the concrete bin 114. The larger pieces from the concrete bin 114 are removed and returned to the furnace operation. The salt cake pieces passed through the grizzly feeder 112 are placed on the conveyor 116.

The conveyor 116 conveys the salt cake pieces to the double-deck screen 118. The salt cake pieces are placed atop the first screen 118a. The salt cake pieces no greater than about ½" square pass through the first screen 118a. Larger salt cake pieces remain atop the first screen 118a. The pieces atop the first screen 118a slide down the first screen onto the first eddy current separator 120, for example, at a rate of about 9.32 tons per hour.

The first eddy current separator 120 settings, for example, are: syntron feeder rate of about 20.3 tons per hour; belt speed of about 400 feet per minute; and rotor speed of about 565 rpm. Based on the example settings and rate of salt cake passage to the first eddy current separator 120 from atop the first screen 118a, product particles having significant aluminum metal concentration (referred to as "concentrate") are obtained. The other particles not having significant aluminum metal concentration (referred to as "rejects") are placed on the third conveyor 122.

The third conveyor 122 conveys the rejects to the second impact crusher 126. The second impact crusher 122 has a gap setting of 1st 2.5 inches, 2nd 0.5 inches. The second impact crusher 106, thus, crushes the rejects from the first eddy current separator 120 into pieces about ½ inch square and smaller. The second impact crusher 122 passes the crushed rejects to the second conveyor 116 where the crushed rejects are combined with salt cake pieces from the grizzly feeder 112. In this manner, the third conveyor 122 and the second impact crusher 126 form a feedback loop for the rejects from the first eddy current separator 120.

Salt cake pieces that pass through the first screen 118a are disposed atop the second screen 118b, for example, a #10 mesh screen. The salt cake pieces that do not pass through the second screen 118b remain atop the second screen 118b. The pieces atop the second screen 118b slide down the second screen 118b to the second eddy current separator 127. The settings of the second eddy current separator 127, for example, are: belt speed of about 400 feet per minute and rotor speed of about 550 rpm. Concentrate is obtained from the second eddy current separator 127 and passed to the sixth conveyor 134. The rejects from the second eddy current separator 127 are placed on the fourth conveyor 128. The fourth conveyor passes those rejects to the third eddy current separator 130.

The third eddy current separator 130 settings, for example, are: belt speed of about 400 feet per minute and rotor speed of about 575 rpm. Concentrate and rejects are available from the third eddy current separator 130. The concentrate is passed to the sixth conveyor 134, and the rejects are passed to the seventh conveyor 138.

The concentrate obtained from each of the first, second, and third eddy current separators 120, 127, and 130 is placed on the sixth conveyor 134. The sixth conveyor 134 conveys the concentrate to the storage 136.

The salt cake particles that pass through the second screen 118b of the double-deck screen 118 are treated as rejects and placed on the fifth conveyor 132. The fifth conveyor 132 conveys the rejects to the seventh conveyor 138. The rejects from the third eddy current separator 130 are also disposed on the seventh conveyor 138. The seventh conveyor 138 passes the rejects to the eighth conveyor 140. The eighth conveyor 140 deposits the rejects in the storage building. The rejects are, from to time, removed from the storage building 142. When so removed, the rejects are placed on the ninth conveyor 144 and conveyed to the loadout equipment 146. The loadout equipment 146 loads the rejects on transport vehicles. The transport vehicles haul the rejects for disposal, for example, in a landfill.

Several examples of the embodiments follow:

EXAMPLE 1—Run 93

Salt cake in the amount of 632,140 lbs. was first hand sorted to remove large chunks of metal or other crush-resistant components. The remaining salt cake was then passed through an impact crusher set to crush the salt cake to approximately 3 inches or less in maximum dimension. The resultant material was passed over a grizzly to remove pieces larger than 3 inches in maximum size. Material passing through the grizzly was passed over a screen with ½-inch openings. The material which did not pass through the screen was sent to eddy current separator (ECS) No. 1 which had its splitter, belt speed, and rotor speed adjusted so as to recover pieces containing a high aluminum metal content. Belt speed was at 333 feet per minute, rotor speed was 565 rpm. Overall processing rate was 26.9 tph. For example, the gap between the low side of the trajectory of concentrate (high-grade) and the top of the trajectory of reject material (low grade) was approximately 1 inch or more. Overall, the eddy current separator receives one flow of material and divides it into 2 products one termed concentrate, the other rejects. The concentrate results primarily from the magnetic forces created by the eddy current separator and contains a higher metal content than either the feed or the rejects. The rejects are what remains of the feed after the concentrate has been extracted. The intent with ECS No. 1 was to recover those large pieces that were mostly aluminum metal and reject those that were either very low in aluminum metal or had a significant non-aluminum metal content.

Rejects from ECS No. 1 were sent to a secondary impact crusher in order to reduce the particle size to less than ½-inch. The crushed material was then sent to the ½-inch screen cited above. In this way a recycle loop was established to enable size reduction of ECS No. 1 rejects in order to free more aluminum metal particles that are in clumped combination with non-metal material.

Material which passed through the ½-inch screen was passed over a screen with 10-mesh openings. The material which passed through the screen was sent to a landfill. Material which did not pass through the 10-mesh screen was sent to ECS No. 2. Belt speed was 436 feet per minute and rotor speed was 552 rpm. In this case the gap between the low side of the trajectory of concentrate (high-grade) and the top of the trajectory of reject material (low grade) was approximately ½-inch or more. As with ECS No. 1 the intent was to recover a high-grade concentrate in preference to extracting the maximum amount of aluminum metal from the ECS feed.

Rejects from ECS No. 2 were sent to ECS No. 3 which had a belt speed of 365 feet per minute and a rotor speed of 575 rpm. The resulting concentrate from ECS No. 3 was a lower grade concentrate than that from ECS No. 1 and ECS No. 2. Specifically, with the splitter position and the rotor speed held constant, the belt speed on ECS No. 3 was adjusted to the 575 rpm speed so as to cause the splitter to be slightly above the upper edge of the range of rejects trajectories. In this manner, material relatively rich in aluminum metal was skimmed from the leading edge of the rejects trajectories.

Rejects from ECS No. 3 were sent to the landfill. Concentrate from all three ECS units was combined and processed in a rotary furnace to recover aluminum metal. Overall 632,140 lbs. of salt cake were processed which resulted in 39,200 lbs. of concentrate. The concentrate, when further processed in the rotary furnace, yielded 15,200 lbs. of aluminum metal. In this run the weight of concentrate collected was 6.20% of the initial salt cake and the final metal collected was 2.4% of the initial salt cake. Furnace recovery, defined as the percent metal recovered from concentrate in a furnace, was 38.78%. Salt cake produced by furnace operations on the concentrate was returned to the salt cake treatment plant for further recovery.

EXAMPLE 2—Run 217

In this run, all settings were adjusted to increase the amount of concentrate relative to the amount of rejects. Processing rate was 46.0 tph. Belt and rotor speeds for the ECS units were as follows:

|        | Rotor Speed (rpm) | Belt Speed (fpm) |
| --- | --- | --- |
| ECS #1 | 568 | 339–340 |
| ECS #2 | 553 | 448 |
| ECS #3 | 576 | 357–359 |

As a result, the splitter cut more deeply into the range of reject trajectories thereby segregating a greater quantity of particles of lower aluminum metal concentration into concentrate. Overall 5,286,760 lbs. of salt cake were processed which resulted in 538,360 lbs. of concentrate. The concentrate, when further processed in a rotary furnace, yielded 170,874 lbs. of aluminum metal. In this run, the weight of concentrate collected was 10.2% of the weight of the initial salt cake and the product aluminum metal collected was 3.23% by weight of the initial salt cake. Furnace recovery was 31.74%. It is apparent that taking a greater weight percentage of concentrate in this run resulted in a lower furnace recovery. This indicates recovery of a lower grade of concentrate. Nonetheless, a higher metal recovery percentage overall was obtained than was obtained in Run 93. The lower grade of concentrate was more than offset by the greater quantity of concentrate collected.

EXAMPLE 3—Run 223

In this run, all settings were further adjusted in order to increase the amount of concentrate relative to the amount of rejects. Processing rate was 39.6 tph. Belt and rotor speeds for the ECS units were as follows:

|        | Rotor Speed (rpm) | Belt Speed (fpm) |
| --- | --- | --- |
| ECS #1 | 565 | 333 |
| ECS #2 | 552 | 436 |
| ECS #3 | 575 | 365 |

Overall 4,735,860 lbs. of salt cake were processed which resulted in 670,440 lbs. of concentrate. The concentrate, when further processed in a rotary furnace, yielded 170,383 lbs. of aluminum metal. In this run, the weight of concentrate collected was 14.16% of the initial salt cake and the weight of metal collected was 3.60% of the initial salt cake. Furnace recovery was 25.41%. Again, it is apparent that taking a greater weight percentage of concentrate in this run further lowered furnace recovery. This indicates that a lower grade, i.e., reduced aluminum metal concentration, of concentrate was obtained from this run, but the run yielded greater total aluminum metal recoveries than Runs 93 and 217. The lower grade of concentrate was more than offset by the greater quantity of concentrate collected.

Several variations are possible in the foregoing embodiments. For example, splitters of each of the first eddy current separators 120, 127, and 130 could be positionable to obtain optimal or otherwise desirable concentrate results. Also, additional or fewer stages of eddy current separation could be used, for example, the system 100 can include four or more stages. Further, the concentrate collected from the various stages could be separately handled, for example, the concentrate obtained from one particular eddy current separator could be furnace heated under different temperatures than the furnace heating of the concentrate from another of the eddy current separators in order to optimize product metal qualities or other reasons. Of course, other variations in treatment of recovered concentrate are possible. Additional stages of crushing and other operations are also possible. Numerous variations in equipment could be made, for example, material feedings, screenings, and impacting could be performed by other equipment, such as valved piping, air tables or gravity separators and presses, respectively. Additionally, the system 100 could be fully or to some other degree automated by, for example, process instrumentation and controls, such as electrical, computerized, non-static hardware or other controls and instruments. Of course, the number of conveyors, storage units, hoppers, loaders, screens, grates, and impactors could each be reduced or increased for particular applications.

Moreover, in other variations, the system and method are used to recover other metals having similar crushing, sorting, filtering, and eddy current separation characteristics, for example, magnesium metal. Additionally, the system and method can be employed to recover aluminum metal or such other metals from dross. The dross can be any of a variety of substances generally referred to as dross. The dross may be white dross or black dross. As those skilled in the art will know and appreciate, white dross is the oxide skim on top of furnace process product, which skim consists of metal particles and metal oxides, and black dross is essentially white dross that contains salt that was added in the furnace process in order to minimize oxidation from the process.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A method for recovering aluminum from salt cake comprising:
   fracturing the salt cakes into manageable pieces,
   sorting the manageable pieces into higher aluminum content pieces and lower aluminum content pieces,
   crushing the lower aluminum content pieces,
   dividing the crushed lower aluminum content pieces into large fragments and small fragments,
   classifying and sorting the large fragments into higher aluminum content fragments and lower aluminum content fragments,
   crushing the lower aluminum content fragments,
   dividing the latter fragments into large fragments and small fragments,
   combining the first mentioned small fragments with the second mentioned small fragments into a mixture of small fragments,
   dividing the mixture of small fragments into three size groups of major particles, minor particles, and negligible particles,
   eddy current separating the major particles into relatively higher aluminum content major particles and relatively lower aluminum content major particles,
   crushing the relatively lower aluminum content major particles,
   dividing the latter particles into major particles, minor particles, and negligible particles,
   combining the first mentioned minor particles with the second mentioned minor particles into a mixture of minor particles,
   eddy current separating the minor particles into relatively higher aluminum content minor particles and relatively lower aluminum content minor particles.

2. The method of claim 1, further comprising eddy current separating the relatively lower aluminum content minor particles into a relatively higher aluminum content set and a relatively lower aluminum content set.

3. The method of claim 1, wherein the method uses a dry process.

4. The method of claim 1, wherein said steps of dividing into large fragments and small fragments are combined into one step.

5. The method of claim 1, further comprising the step of removing iron containing pieces from the crushed lower aluminum content pieces.

6. The method of claim 1, further comprising the step of retaining all pieces, fragments, and particles having a higher aluminum content or a relatively higher aluminum content.

7. A system for recovering aluminum from salt cake, the system comprising:
   means for fracturing the salt cakes into manageable pieces,
   an impactor for crushing the lower aluminum content pieces,
   a separator for dividing the crushed lower aluminum content pieces into large fragments and small fragments,
   at least one screen for dividing the small fragments into three size groups of major particles, minor particles, and negligible particles,
   an eddy current separator for separating the major particles into relatively higher aluminum content major particles and relatively lower aluminum content major particles,
   means for crushing the relatively lower aluminum content major particles,
   means for returning the relatively lower aluminum content major particles to the at least one screen, and
   a second eddy current separator for separating the minor particles into relatively higher aluminum content minor particles and relatively lower aluminum content minor particles.

8. The system of claim 7 further comprising:
   a third eddy current separator for separating the relatively lower aluminum content minor particles into a relatively higher aluminum content set and a relatively lower aluminum content set.

9. The system of claim 7 further comprising means for removing iron containing pieces from the crushed lower aluminum content pieces.

10. The system of claim 7, wherein the entire system is a dry process.

11. A method for recovering aluminum from salt cake comprising:
    forming small fragments from salt cake,
    dividing the small fragments into three size groups of major particles, minor particles, and negligible particles,
    eddy current separating the major particles into relatively higher aluminum content major particles and relatively lower aluminum content major particles,
    crushing the relatively lower aluminum content major particles,
    dividing the latter particles into major particles, minor particles, and negligible particles, combining the first mentioned minor particles with the second mentioned minor particles into a mixture of minor particles, and eddy current separating the minor particles into relatively higher aluminum content minor particles and relatively lower aluminum content minor particles.

12. The method of claim 11, further comprising eddy current separating the relatively lower aluminum content minor particles into a relatively higher aluminum content set and a relatively lower aluminum content set.

13. The method of claim 11, wherein the method uses a dry process.

14. The method of claim 11, further comprising the step of removing iron containing pieces from the crushed lower aluminum content pieces.

15. The method of claim 11, further comprising the step of retaining all particles having a relatively higher aluminum content.

\* \* \* \* \*